(12) United States Patent
Tanaka et al.

(10) Patent No.: US 9,721,283 B2
(45) Date of Patent: Aug. 1, 2017

(54) LOCATION BASED TRANSACTIONS

(75) Inventors: Ray Hideki Tanaka, San Jose, CA (US); Srikanth Nandiraju, Fremont, CA (US); Mehryar Mansoor, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 368 days.

(21) Appl. No.: 12/895,409

(22) Filed: Sep. 30, 2010

(65) Prior Publication Data

US 2012/0084177 A1 Apr. 5, 2012

(51) Int. Cl.
*G06Q 30/00* (2012.01)
*G06Q 30/06* (2012.01)

(52) U.S. Cl.
CPC ..... *G06Q 30/0601* (2013.01); *G06Q 30/0613* (2013.01)

(58) Field of Classification Search
CPC ............ G06Q 30/0601; G06Q 30/0613
USPC ..... 705/26.1, 26.2, 26.25, 26.3, 26.35, 26.4, 705/26.41–26.44, 26.5, 26.61–26.64, 26.7, 705/26.8, 26.81, 26.82, 26.9, 27.1, 27.2
See application file for complete search history.

(56) References Cited

U.S. PATENT DOCUMENTS

| | | | |
|---|---|---|---|
| 6,332,134 B1* | 12/2001 | Foster | 705/36 R |
| 6,816,778 B2* | 11/2004 | Diaz | 701/465 |
| 6,970,871 B1* | 11/2005 | Rayburn | |
| 6,996,579 B2* | 2/2006 | Leung et al. | |
| 7,260,472 B2* | 8/2007 | Sutardja | 701/117 |
| 8,126,774 B2* | 2/2012 | Hendrickson et al. | 705/14.49 |
| 8,380,177 B2* | 2/2013 | Laracey | 455/414.1 |
| 2002/0120582 A1* | 8/2002 | Elston et al. | 705/64 |
| 2002/0143660 A1 | 10/2002 | Himmel et al. | |
| 2006/0022048 A1 | 2/2006 | Johnson | |
| 2006/0099964 A1 | 5/2006 | Barrese et al. | |
| 2007/0174117 A1 | 7/2007 | Hendrickson et al. | |
| 2007/0192229 A1* | 8/2007 | Rowan | 705/37 |
| 2008/0228582 A1* | 9/2008 | Fordyce et al. | 705/14 |
| 2009/0094123 A1 | 4/2009 | Killian et al. | |
| 2009/0150262 A1 | 6/2009 | Mizhen | |
| 2009/0248538 A1 | 10/2009 | Taylor | |
| 2009/0313138 A1 | 12/2009 | Ratnakar | |
| 2010/0082447 A1 | 4/2010 | Lin et al. | |
| 2011/0137804 A1* | 6/2011 | Peterson | 705/77 |

FOREIGN PATENT DOCUMENTS

WO   03038560 A2   5/2003

OTHER PUBLICATIONS

Peter Mell et al. "Effectively and Securely Using the Cloud Computing Paradigm", NIST, Information Technology Laboratory, Oct. 7, 2009.*

(Continued)

*Primary Examiner* — Naeem Haq
(74) *Attorney, Agent, or Firm* — Haynes and Boone, LLP

(57) ABSTRACT

A user's location is determined by location information communicated by a user device, such as a smart phone. Merchants near the user location are determined and selected. Merchant payment information is transmitted to the user device so that the user can easily make a payment to the merchant through the user device. Merchant offerings may also be sent to the user device for purchase and subsequent payment, where the merchant offerings may be specifically selected for the user.

17 Claims, 5 Drawing Sheets

(56) References Cited

OTHER PUBLICATIONS

M. Giometti, et al., "Creating Winning M-Commerce Models in the Financial Services", FutureBanker, vol. 5, No. 10, Dec. 2001, p. 37.*

Hoffman, Karen Epper, "New Options in Wireless Payments. (Company Business and Marketing)", Internet World, vol. 7, No. 7, Apr. 1, 2001, pp. 37.*

Steven Bellman et al. "Predicators of Online Buying Behavior", Communication of the ACM, Dec. 1999/vol. 42, No. 12, pp. 32-38.*

Natalia Marmasse et al. "Location-Aware Information Delivery with ComMotion", P. Thomas and H.-W. Gellersen (Eds.): HUC 2000, LNCS 1927, pp. 157-171, 2000. © Springer-Verlag Berlin Heidelberg 2000.*

Yuichiro Takeuchi et al. "CityVoyager: an Outdoor Recommendation system Based on User Location History", J. Ma et al. (Eds.): UIC 2006, LNCS 4159, pp. 625-636, 2006. © Springer-Verlag Berlin Heidelberg 2006.*

PCT International Search Report from PCT/US2011/051454 Dated Jan. 31, 2012.

Patent Examination Report No. 4 for patent Application 2011314307 issued by Australian Government (IP Australia) on Sep. 3, 2015, pp. 1-3.

\* cited by examiner

LOCATION BASED TRANSACTIONS

BACKGROUND

Technical Field

The present invention generally relates to facilitating financial transactions over a network and more particularly to location based mobile commerce.

Related Art

In online financial transactions, customers search for and purchase products through electronic communications with online merchants over electronic networks, including mobile communication networks. During the course of these online transactions, customers may not readily know the physical location of the products or the merchants offering the products for sale or purchase consideration. Typically, after purchase these products are shipped via mail to an address related to the customer. Sometimes, waiting for the purchased products can be inconvenient and unnecessary.

Recently, with the increasing capabilities of smart phones, consumers are utilizing their mobile devices more and more, for tasks beyond simply placing and receiving calls. For example, consumers are now able to make payments and shop through their mobile device, using services provided by companies such as eBay, Inc. and PayPal, Inc., both of San Jose, Calif.

Thus, there is an ever-present need to provide the consumer with an easier shopping or paying experience, which would be advantageous to both merchants and consumers.

SUMMARY

Embodiments of the present disclosure relate to facilitating financial transactions over a network and to location based mobile commerce. In various embodiments, systems and methods for facilitating financial transactions over a network include first determining a location of a user or consumer, based on the user's mobile device. Merchants, stores, or other sellers near the user are located and presented to the user on the mobile device. If there is more than one merchant, the user may select a desired one of the merchants.

Once selected or determined, the user may make a payment to the merchant through the user's mobile device. For example, the merchant's account information with a payment provider, such as PayPal, Inc., may be associated with the particular merchant location. The user may be shown account information for the merchant to allow the user to make a payment through the payment provider on the user's mobile device. In one embodiment, the user simply needs to log in, enter a payment amount, and confirm the payment. There would be no need to enter any recipient or merchant account information, such as an email address or phone number. After the payment has been processed, the user and/or the merchant may receive a confirmation (or denial) of the payment request. If approved, the user may then simply take possession of the purchase. For example, the user may pick up the item(s) at the store or at a check-out counter and have the merchant confirm.

In another embodiment, selected inventory or items from the merchant may be presented to the user on the user's mobile device when the merchant is selected or determined. The user can then select desired items. Payment can be processed as discussed above.

In other embodiments, the merchant may be able to offer goods and services through a mobile device, where the merchant inventory is stored in a cloud. As a result, the merchant may upload any desired item or items for sale at a physical location (e.g., a physical store), on a merchant website, or third party marketplace sites.

The merchant, through the mobile device, may offer specific coupons, deals, or merchandise to specific customers, such as "loyal" customers, customers at the store, etc., with differing parameters, such as time and/or location based.

These and other features and advantages of the present invention will be more readily apparent from the detailed description of the embodiments set forth below taken in conjunction with the accompanying drawings.

Figure 1:
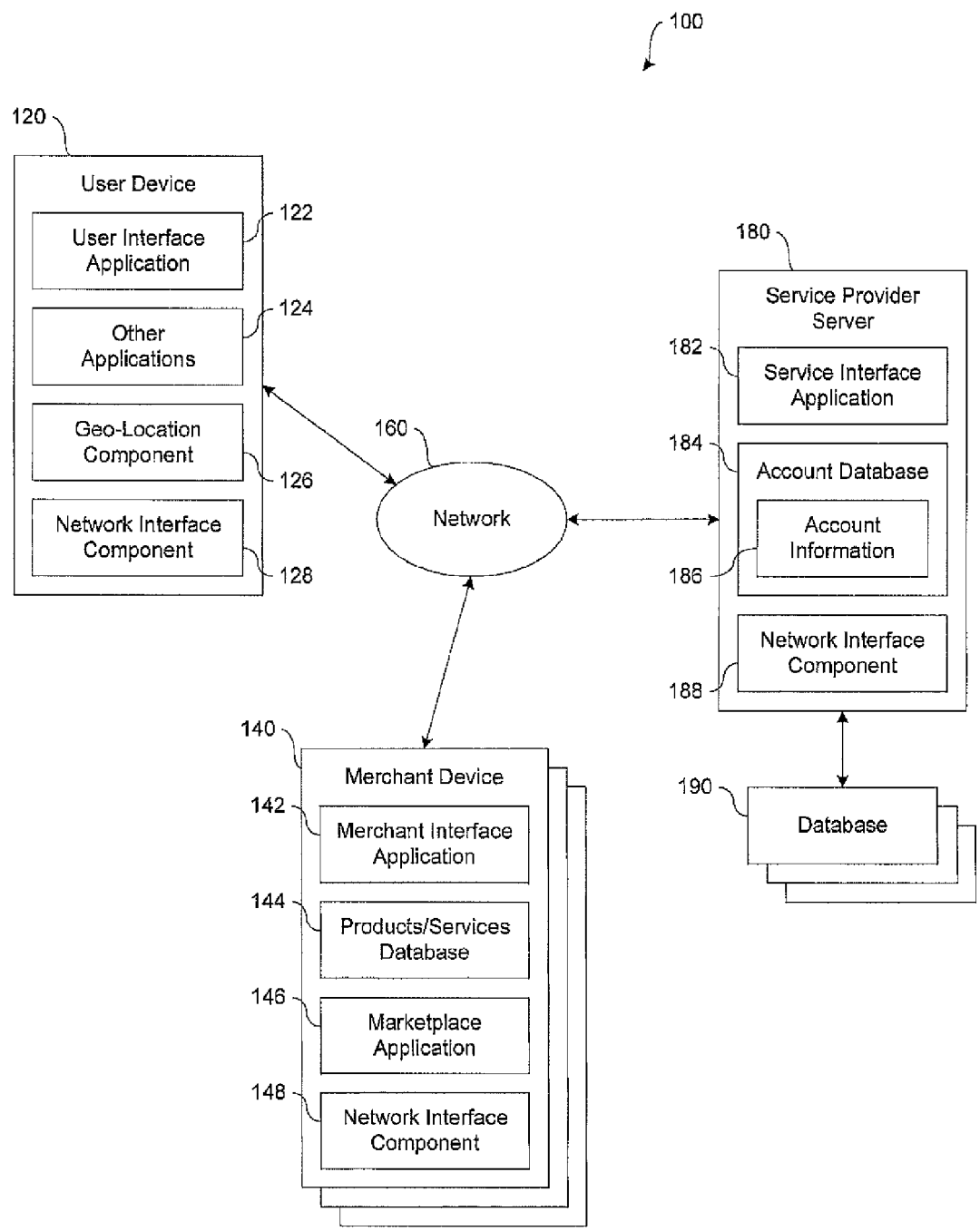
FIG. 1 is a block diagram of a system adapted to facilitate location based mobile commerce over a network, according to one embodiment.

Embodiments of the invention and their advantages are best understood by referring to the detailed description that follows. It should be appreciated that like reference numerals are used to identify like elements illustrated in one or more of the figures, wherein showings therein are for purposes of illustrating embodiments of the invention and not for purposes of limiting the same.

DETAILED DESCRIPTION

Embodiments of the present disclosure provide systems and methods for location based mobile commerce for both consumers and merchants so that consumers can more easily shop and make purchases through a mobile device and merchants can provide more targeted offerings. A user location is determined through a user device, where the location information can be used by the merchant and/or a payment provider to identify merchants to the user, identify merchant payment information to the user for easier user payments, identify specific goods to the user, and other location-based services. In one embodiment, merchants have the capability to create an electronic shop, possibly directed to the user, via a communication network, such as via a mobile communication device (e.g., a cell phone) and/or the Internet. The electronic shop may be integrated with purchase and payment options (e.g., an online payment processing service) for a user to purchase directly from the user's mobile communication device.

FIG. 1 is block diagram a system 100 for facilitating financial transactions including location based mobile commerce over a network 160, such as the Internet via, e.g., mobile communication networks. System 100 includes a user device 120 (e.g., a client or customer device) adapted to interface with one or more merchant devices 140 (e.g., devices associated with business entities proffering items, products, and/or services for purchase), and a service provider 180 (e.g., a network based financial transaction service provider, such as a payment and settlement transaction provider) over network 160. Service provider 180 may be maintained by a payment provider, such as PayPal, Inc. of San Jose, Calif.

Network 160, in one embodiment, may be implemented as a single network or a combination of multiple networks. For example, network 160 may include a wireless telecommunications network (e.g., cellular telephone network) adapted for communication with one or more other communication networks, such as the Internet. In other examples, network 160 may include the Internet, one or more intranets, landline networks, wireless networks, and/or one or more other appropriate types of communication networks. As such, in various implementations, user device 120, merchant device 140, and service provider server 180 may be associated with a particular link (e.g., a link, such as a URL (Uniform Resource Locator) to an IP (Internet Protocol) address).

User device 120, in various embodiments, may be implemented using any appropriate combination of hardware and/or software configured for wired and/or wireless communication over network 160. In one embodiment, user device 120 may be implemented as a mobile communication device (e.g., wireless cellular phone) adapted for communication with network 160. In other embodiments, user device 120 may be implemented as a personal computer (PC), a personal digital assistant (PDA), a notebook computer, and/or various other generally known types of wired and/or wireless computing devices for communication with network 160. User device 120 is typically mobile. It should be appreciated that user device 120 may be referred to as a client device or a customer device without departing from the scope of the present disclosure.

User device 120, in one embodiment, includes a user interface application 122, which may be utilized by a user to conduct network based financial transactions (e.g., remote network based commerce, such as shopping, purchasing, bidding, etc.) with merchant device 140 and/or the service provider server 180 over the network 160. For example, user interface application 122 may be implemented as a location based mobile commerce application to initiate, track, manage, and store information related to remote network based commerce for viewing, searching, and purchasing of items, products, and/or services over the network 160. In one implementation, user device 120 may be linked to an account with the service provider for direct and/or automatic settlement of purchase requests between the user and the merchant via user interface application 122, in a manner as described herein.

In one embodiment, user interface application 122 comprises a software program, such as a graphical user interface (GUI), executable by a processor that is configured to interface and communicate with merchant device 140 and/or service provider server 180 via the network 160. In one aspect, user interface application 122 comprises a browser module that provides a network interface to browse information available over network 160. For example, user interface application 122 may be implemented, in part, as a web browser to view and search information available over network 160. In another example, the user is able to access websites or inventory associated with merchant device 140 to view, search, and select items, products, and/or services for purchase, where the user is able to purchase selected items, products, and/or services from merchant device 140 via service provider server 180. As such, the user may conduct network based financial transactions (e.g., location based mobile commerce for purchasing and proffering payment for items, products, and/or services) from merchant device 140 via the service provider server 180.

User device 120, in various embodiments, may include other applications 124 as may be desired to provide additional features available to the user. In one example, such other applications 124 may include security applications for implementing user-side security features, programmatic client applications for interfacing with appropriate application programming interfaces (APIs) over the network 160, and/or various other types of generally known programs and/or software applications. In still other examples, applications 124 may interface with user interface application 122 for improved efficiency and convenience. In one example, files, data, and/or information may be imported from various types of accounting software (e.g., a spreadsheet application) directly into user interface application 122 for improved tracking of payments and settlements related to purchases via network 160.

Applications 124 may also include payment applications that allow the user to make payments to the merchant through service provider server 180. For example, an application may be accessible on the user device that allows the user to enter recipient payment information, as well as any log in information for the user. This can be to access the user's account with the service or payment provider and identify the recipient (e.g., the merchant) with the service provider so that the service provider can process the payment request. Application 124 may include the ability for the payment provider to populate merchant information for the user based on location, as discussed herein.

User device 120, in one embodiment, includes a geo-location component 126 adapted to monitor and provide an instant geographical location (i.e., geo-location) of user device 120 to the service provider and/or the merchant. In one implementation, the geo-location of user device 120 may include global positioning system (GPS) coordinates, latitude/longitude, zip-code information, area-code information, street address information, and/or various other generally known types of geo-location information. In one example, the geo-location information may be automatically obtained and/or provided by user device 120 via an internal or external GPS monitoring component. In one aspect, when interfacing with user device 120, the user may elect to provide or may be prompted to provide permission for the release of geo-location information. Accordingly, the user may have exclusive authority to allow transmission of geo-location information from user device 120 to merchant device 140 and/or the service provider server 180. In any instance, merchant device 140 and/or service provider server 180 may communicate with user device 120 via network 160 and request permission to acquire geo-location information from user device 120 for geo-location based mobile commerce. These and other aspects of the present disclosure are described in greater detail herein.

User device 120, in one embodiment, includes a network interface component (NIC) 128 adapted for communication with network 160. In various implementations, network interface component 128 may comprise a wireless communication component, such as a wireless broadband component, a wireless satellite component, or various other types of wireless communication components including radio frequency (RF), microwave frequency (MWF), and/or infrared frequency (IRF) components adapted for communication with network 160. In other various implementations, network interface component 128 may be adapted to interface with a DSL (e.g., Digital Subscriber Line) modem, a PSTN (Public Switched Telephone Network) modem, an Ethernet device, and/or various other types of wired and/or wireless network communication devices adapted for communication with network 160.

User device 120 may include a user identifier, which may be implemented, for example, as operating system registry entries, cookies associated with user interface application 122, identifiers associated with hardware of user device 120, and/or various other appropriate identifiers. The user identifier may include one or more attributes related to the user, such as personal information related to the user (e.g., one or more user names, passwords, photograph images, biometric ids, addresses, phone numbers, etc.) and banking information (e.g., one or more banking institutions, credit card issuers, user account numbers, security data and information, etc.). In various aspects, the user identifier may be passed with a user login request or purchase request to service provider server 180 via network 160, and the user identifier may be used by service provider server 180 to associate the user with a particular user account maintained by service provider server 180.

Merchant device 140, in one embodiment, may be implemented using any appropriate combination of hardware and/or software configured for wired and/or wireless communication over network 160. In one embodiment, merchant device 140 may be implemented as a mobile communication device (e.g., wireless cellular phone or iPad by Apple) adapted for communication with network 160. In other embodiments, merchant device 140 may be implemented as a network server, a personal computer (PC), a personal digital assistant (PDA), a notebook computer, and/or various other generally known types of wired and/or wireless computing devices for communication with network 160.

Merchant device 140 may be maintained as one or more network servers by a business entity (e.g., merchant site, resource information site, utility site, real estate management site, social networking site, etc.) offering various items, products, and/or services for purchase and payment over network 160. Accordingly, merchant device 140 may comprise at least one network based server in communication with network 160 having a merchant interface application 142, a products/services database 144, and a marketplace application 146 for presenting and identifying one or more available items, products, and/or services for purchase to the user or service provider via network 160. In one aspect, the merchant server may be accessible via a mobile communication device (e.g., wireless cellular phone) for management purposes. For example, the merchant has the ability to access and interact with its own network based merchant server via a mobile communication device to manage merchant parameters, item listings, radius of coverage, user search statistics, etc. and generate reports related thereto.

In one embodiment, merchant device 140 includes merchant interface application 142, which may be utilized to conduct network based financial transactions (e.g., shopping, purchasing, bidding, etc.) with one or more users and/or service provider server 180 over network 160. For example, merchant interface application 142 may be implemented as a location based mobile commerce application to initiate, track, manage, and store information related to network based commerce for the viewing, searching, and purchasing of items, products, and/or services by users over network 160.

Merchant device 140 may be linked to an account with service provider server 180 for direct and/or automatic settlement of purchase requests between the merchant 140 and users via merchant interface application 142 and marketplace application 146. In one embodiment, merchant interface application 142 comprises a software program, such as a GUI, executable by a processor that is configured to interface and communicate with one or more users and/or service provider server 180 via network 160. Merchant interface application 142 may also include a network interface module that makes information available to user device 120 over network 160. For example, merchant interface application 142 may be implemented, in part, as a website manager to provide, list, and present information, such as products, coupons, offers, etc., to user device 120 via network 160.

In another example, merchant device 140 is capable of providing one or more network based websites to allow viewing, searching, and selecting of items, products, and/or services for purchase by the user via user device 120, where the user is able to purchase items, products, and/or services from the merchant and make payments through service provider server 180. Accordingly, merchant device 140 may conduct financial transactions (e.g., location based mobile commerce for purchasing and proffering payment for items, products, and/or services) with the user via merchant interface application 142 and service provider server 180, in a manner as described herein.

Merchant device 140 may include a marketplace application 146, which may be configured to provide information related to products and/or services database 144 to user device 120 via network 160. For example, the user may interact with marketplace application 146 through user interface application 122 to search and view various items, products, and/or services available for purchase from products/services database 144, where the offerings may be based on user location. Marketplace application 146 may include a checkout module, which may be configured to facilitate online financial transactions (e.g., geo-location based mobile commerce) by the user of items, products, and/or services identified by merchant server 140 for purchase. Accordingly, in one aspect, the checkout module of marketplace application 146 may be configured to accept payment from the user over network 160 and process the payment via interaction with service provider server 180.

Merchant device 140, in various embodiments, may include at least one merchant identifier, which may be included as part of the one or more items, products, and/or services made available for purchase so that, e.g., particular items, products, and/or services are associated with a particular merchant. In one implementation, the merchant identifier may include one or more attributes and/or parameters related to the merchant, such as business and/or banking information. For example, the merchant identifier may be passed from a particular merchant to service provider server 180 when the user selects an item, product, and/or service for hold, monitor, and/or purchase from the particular merchant. Merchant identifier 148 may be used by service provider server 180 to associate particular items, products, and/or services selected for purchase with a particular merchant account maintained by service provider server 180. As described in greater detail herein, the user may conduct financial transactions (e.g., selection, monitoring, purchasing, and/or providing payment for items, products, and/or services) with merchant server 140 via service provider server 180 over network 160.

In various embodiments, the business associated with merchant server 140 may need to establish at least one merchant account with service provider server 180. When establishing a merchant account, each of the one or more business entities may need to provide business information, such as owner name, owner address, social security number, date of birth, phone number, email address, etc., and financial information, such as banking information, merchant account information, credit card information, payment processing information, etc. In one embodiment, the business or merchant also provides location information for one or more sales, store, or retail facilities, where the user may be present for shopping. For example, the merchant may provide an address, a latitude and longitude, or other information that enables the service provider to determine location of the merchant.

Merchant device 140 may also include a network interface component (NIC) 148 adapted for communication with network 160. Network interface component 148 may include a wireless communication component, such as a wireless broadband component, a wireless satellite component, or various other types of wireless communication components including radio frequency (RF), microwave frequency (MWF), and/or infrared frequency (IRF) components adapted for communication with network 160. Network interface component 148 may be adapted to interface with a DSL (e.g., Digital Subscriber Line) modem, a PSTN (Public Switched Telephone Network) modem, an Ethernet device, and/or various other types of wired and/or wireless network communication devices adapted for communication with network 160.

Service provider server 180, in one embodiment, may be maintained by an online transaction processing entity, which may provide processing for online financial transactions and/or information transactions between user device 120 and merchant device 140. Service provider server 180 may include a service interface application 182, which may be adapted to interact with user device 120 and/or merchant device 140 over network 160 to facilitate the selection, purchase, and/or payment of items, products, and/or services by user device 120. In one example, service provider server 180 may be provided by PayPal, Inc. and/or eBay of San Jose, Calif., USA.

Service interface application 182 may include a payment processing module to process purchases and/or payments for financial transactions between user device 120 and a merchant. In one embodiment, the payment processing module assists with resolving financial transactions through validation, delivery, and settlement. Accordingly, service interface application 182 in conjunction with the payment processing module is adapted to settle indebtedness between the user and the merchant, wherein accounts may be directly and/or automatically debited and/or credited of monetary funds in a manner as accepted by the banking industry.

Service application 182, in one embodiment, may utilize a selection processing module to process and monitor user selection events during online shopping by the user via user device 120. The selection processing module allows service provider server 180 to process and monitor user selections during online navigation and shopping events over network 160. For example, service provider server 180 interfaces with user device 120 via, e.g., a browser window to monitor the user and user device 120 during navigation and shopping events on various merchant sites. The selection processing module may be used by service provider server 180 to monitor user selections of one or more items, products, and/or services.

Service provider server 180 may be configured to maintain one or more user accounts and merchant accounts in an account database 184, each of which may include account information 186 associated with one or more individual users and one or more merchants. For example, account information 186 may include private financial information of the user and the merchant, such as one or more account numbers, passwords, credit card information, banking information, or other types of financial information, which may be used to facilitate online financial transactions between the user and the merchant. Account database 184 may also include location information for the user and the merchant to assist in location-based transactions as discussed herein.

In one embodiment, the user and/or user device 120 may have identity attributes stored with service provider server 180, and the user and/or user device 120 may have credentials to authenticate or verify identity with service provider server 180. User attributes may include personal information and banking information, as previously described. In various other aspects, the user attributes may be passed to service provider server 180 as part of a login, selection, purchase, and/or payment request, and the user attributes may be utilized by service provider server 180 to associate the user and/or user device 120 with one or more particular user accounts maintained by service provider server 180.

Similarly, merchant device 140 may have identity attributes stored with service provider server 180, and merchant device 140 may have credentials to authenticate or verify identity with service provider server 180. In one aspect, merchant attributes may include business information, such as location(s), and banking information, as previously described. In various other aspects, the merchant attributes may be passed to service provider server 180 as part of a registration, login, and/or transaction request, and the merchant attributes may be utilized by service provider server 180 to associate e merchant device 140 with one or more particular merchant accounts maintained by service provider server 180, as well as provide location-based services.

Service provider server 180 may include at least one network interface component (NIC) 188 adapted for communication with network 160 and any network based communication devices including network interface component 128 of user device 120 and network interface component 148 of merchant device 140. In various implementations, network interface component 188 may include a wireless communication component, such as a wireless broadband component, a wireless satellite component, or various other types of wireless communication components including radio frequency (RF), microwave frequency (MWF), and/or infrared frequency (IRF) components adapted for communication with the network 160. Network interface component 188 may be adapted to interface with a DSL (e.g., Digital Subscriber Line) modem, a PSTN (Public Switched Telephone Network) modem, an Ethernet device, and/or various other types of wired and/or wireless network communication devices adapted for communication with network 160.

Service provider server 180 may include one or more databases 190 (e.g., internal and/or external databases) for storing and tracking information related to transactions between the user, the merchant, and the service provider. For example, databases 190 may provide a historical survey of financial transactions (e.g., network based financial transactions, such as geo-location based mobile commerce) between user device 120, merchant device 140, and service provider server 180. As such, in one implementation, service interface application 182 may be adapted to track, log, store financial transaction information related to network based commerce between user device 120 and merchant device 140 and then access this financial information from databases 190 for analysis, maintenance, and settlement.

Figure 2:
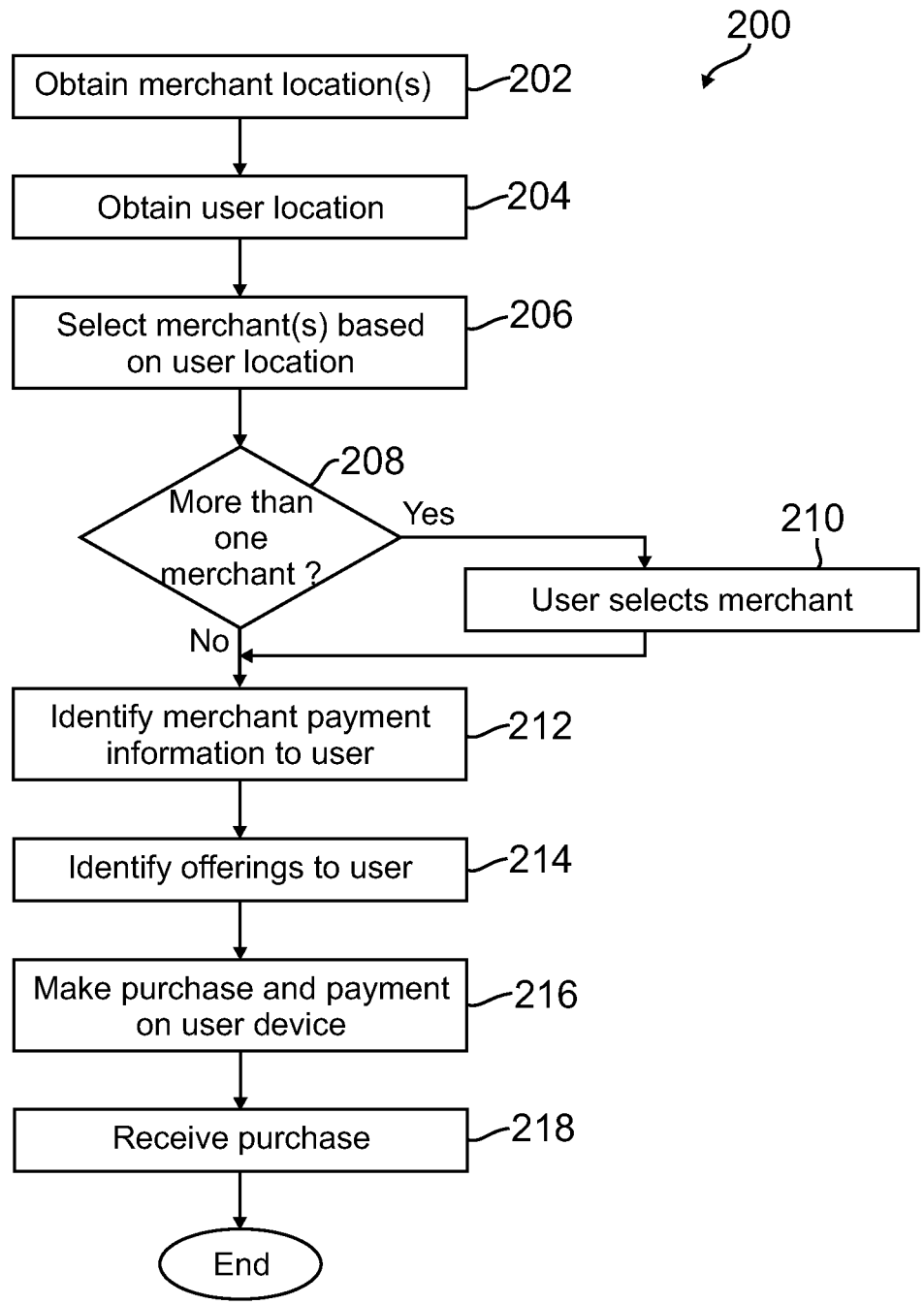
FIG. 2 is a flowchart of steps performed in a location-based transaction, according to one embodiment.

FIG. 2 is a flowchart 200 of steps performed in a location-based transaction over a network, according to one embodiment. Note that the method assumes the merchant and user have accounts with the payment provider. If one or both parties do not have an account, the payment provider may request an account be created, such as asking for a funding account, a password, a user name, an email address, a phone number, etc. Account creation is known and will not be discussed herein. In some embodiments, a party need not have an existing account in order to use the location-based transaction method.

At step 202, one or more locations for a merchant are obtained by a payment or service provider. The locations may be where the merchant has merchandise and/or services available for purchase, such as a store, a kiosk, a stand, a warehouse, etc. Thus, a merchant may have more than one location. The locations may be obtained through different means. For example, the merchant may be asked to enter specific addresses, which would be converted to GPS coordinates or latitude/longitude coordinates, to enter latitude/longitude coordinates directly, or allow the payment provider to determine location from a device at each merchant location, such as through a GPS capability within the merchant device. The merchant device may be an iPad from Apple or other device that can transmit location information. The merchant may enter the location information at any time, such as during a registration process with the payment provider or when a location changes or is added.

At step 204, the payment provider determines the location of a user through a user mobile device. For example, the user may be walking toward or at a merchant location. In one embodiment, the user has allowed the location of the device to be transmitted to and used by the payment provider. Thus, the user's device, which can be a smart phone or other device capable of computing and transmitting location information, enables the payment provider to obtain user (i.e., user device) location. User location may be continually transmitted to the payment provider or only at certain times, such as when the user logs into or opens an application for the payment provider.

With this information, the payment provider selects merchant(s), at step 206, that are near the present user location. Proximity to the user may be set by the accuracy of location system, by the user, or by the payment provider. For example, the user may only want to know of merchants within 100 meters of the user, or the payment provider may select merchants that are within 50 meters of the user. This distance may vary depending on the attributes of the area as well, such as expanding the zone in rural areas or decreasing the zone in populated shopping areas, such as a mall or flea market.

Next, a determination is made, at step 208, whether there is more than one merchant within the user's location. In one example, the user may be in an area densely populated with registered merchants. Thus, even though the user may be in a store of a merchant, there may still be other merchants identified by the payment provider.

If more than one merchant is identified, the payment provider may provide a list of the identified merchants to the user through the user device. The user may then select one or more desired merchants at step 210. In the above example, if the user is at a particular merchant store, the user may select only that merchant or the user may select nearby merchants the user intends to visit after leaving the current store. Selection may be accomplished in any number of ways, such as selecting from a list of merchant names, locations, logos, etc.

Once one or more merchants have been identified, either because only a single merchant was located near the user or the user selecting from a list of nearby merchants, the payment provider transmits payment information of the identified merchants to the user at step 212. The merchant payment information may be automatically populated into a payment request form for the merchant on the user device. In one embodiment, the payment information includes information the user needs to identify the merchant to the payment provider to make a payment. In one embodiment, this may be an email address of the merchant, an account number, a sequence of characters, a phone number, or any other identifier. The identifier may be specific to the location or generally for the merchant. For example, the merchant may want separate accounts for different locations rather than a single account for all locations. The reasons may be the desire to keep purchases separated by location, such as when each location is a separate franchisee or for easier accounting for individual store sales.

Optionally, the payment provider may also identify specific offerings from the selected merchant(s) to the user at step 214. Using information about the user and merchant, the payment provider may be able to offer specific items, coupons, incentives, etc., with or without conditions, to the user. The offerings may be from the merchant, the payment provider, or another party. For example, if the is a loyal customer and is known to purchase DVDs from this merchant (or other merchants), the user may be presented with coupons or specials for DVDs for an in-store purchase. This enables a more tailored user-specific shopping experience and may promote additional spending.

At step 216, the user may make a purchase and payment on the user's device. The user may select desired items through the user device, place them in a cart, and checkout, where the checkout process includes the merchant payment information already entered. Thus, the user may simply need to approve a payment amount or first enter a payment amount and then approve. Once the payment request is submitted, the payment provider processes the request and makes a determination whether to approve the payment request. This can be done through standard payment provider steps.

Assuming the payment request is approved, the payment provider may send a notification to the merchant and/or user that the payment has been made. The notification may include a receipt of the purchase. With the purchase having been paid for, the user may then receive the purchase at step 218. For example, the user may simply need to show the receipt, identification, or other information that allows the merchant to release the purchase to the user.

Therefore, the user can quickly and easily make a payment while at or near a store using the user's mobile device. The following example illustrates one use case. The user wants to purchase a double espresso from a nearby coffee shop. As the user nears the coffee shop, the user sees a list of retailers in the area, including the coffee shop on the user's mobile phone. After the user selects the coffee shop, the user sees a selection of coffees and other items on the phone. The user selects a double espresso and receives a total amount. The user enters an additional $1.00 for a tip and transmits the payment request to PayPal, where the coffee shop account or payment identifier has been attached to the payment request without the user having to enter the identifier. The user receives a confirmation that the payment has been made. The user reaches the coffee counter, where the espresso has been made and is waiting. The user shows the receipt from the phone to the person at the counter and receives the espresso. As a result, the user did not have to wait in line to make an order and payment and receives the espresso sooner than with a conventional purchase.

Figure 3:
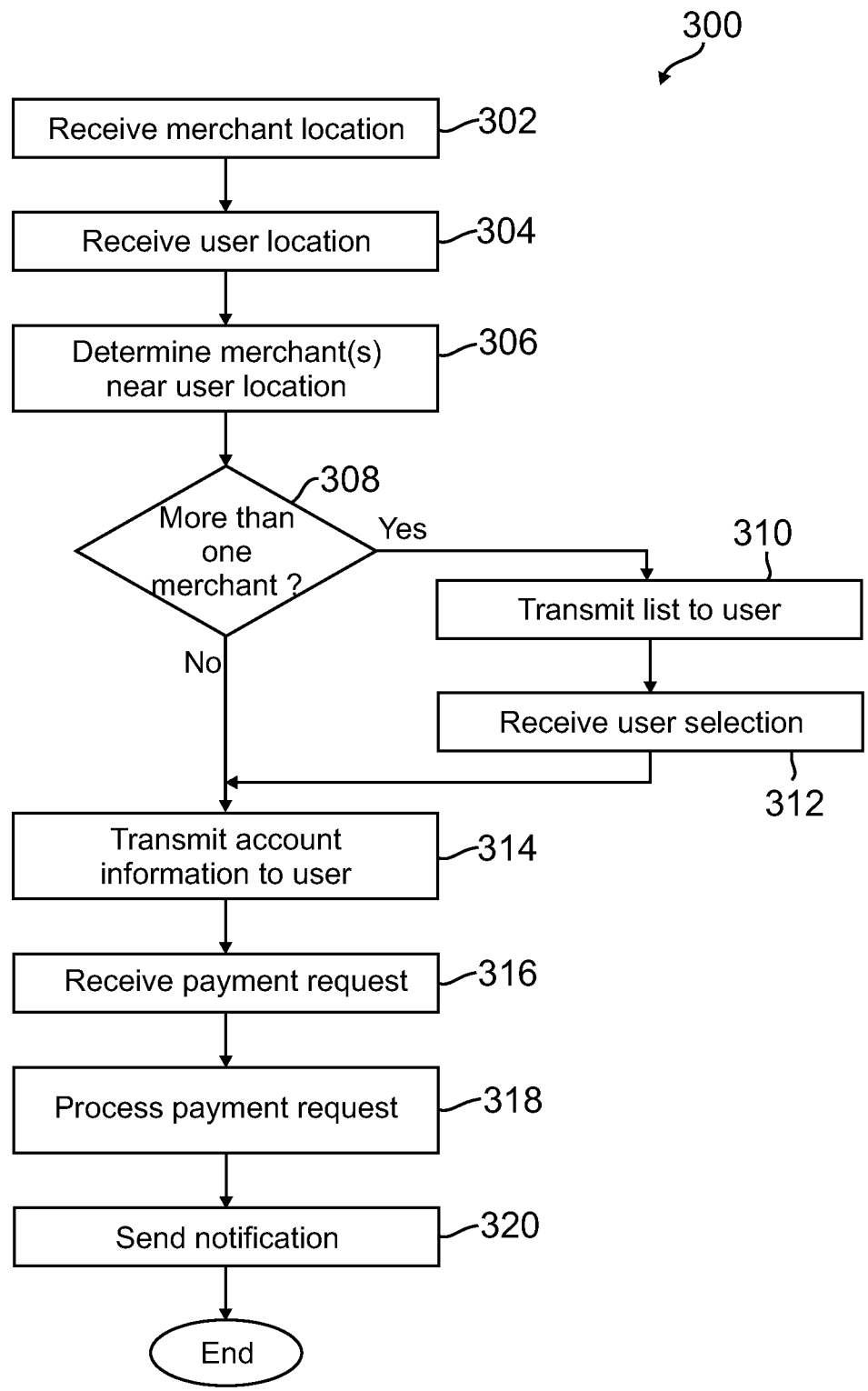
FIG. 3 is a flowchart of steps performed by a payment provider in a location-based transaction, according to one embodiment.

FIG. 3 is a flowchart 300 of steps performed by a payment provider in a location-based transaction, according to one embodiment. At step 302, the payment provider receives location information of a merchant store, kiosk, booth, etc., as described above. If the merchant has multiple locations, the merchant may specify whether a single account should be associated with all locations or different accounts are to be associated with different locations. For the latter, the merchant specifies a specific account for each location, where each location has a different account or two or more locations share the same account. The payment provider then associates each location with the designated account for the merchant. The payment provider may have thousands upon thousands of merchants, locations, and account information stored in its database or within a cloud.

At step 304, the payment provider receives the user's location through the user's mobile device, as discussed above. In one embodiment, the location is conveyed as latitude and longitude coordinates, although other forms of location information, such as an address, may also be suitable.

The payment provider then determines which, if any, merchants are near the user's received location at step 306. As discussed above with respect to step 206 in FIG. 2, the payment provider may use any suitable criteria for determining what is "near" the user's location. If no merchants are nearby, the payment provider does not transmit any information to the user device. However, if one or more merchants are found nearby, as determined at step 308, payment information for the merchant is conveyed to the user device.

If more than one merchant is near the user, the payment provider transmits a list of those merchants to the user device at step 310. The list or other format allows the user to easily identify the merchants on the user's device. For example, the user may see logos or names of the merchants. The list also allows the user to easily select one or more merchants, such as by simply tapping on the name or logo of the merchant.

After the user makes the selection(s), the information is transmitted through the user device to the payment provider, which then receives the user's selection(s) at step 312. The payment provider then determines the desired information for the selected merchant(s).

Next, at step 314, the payment provider transmits at least account information to the user device. The account information will enable the user to make a payment request to the payment provider identifying the recipient without the user having to manually enter recipient account or identification information. The payment provider accesses and transmits the necessary information based on the merchant account information stored for the location. For example, the information may be an email address, a phone number, an account number, a string of characters, or other identifying data.

The payment provider then waits for a payment request from the user. For example, after receiving desired merchant account or payment information, the user may make a payment request through the user's mobile device. This may entail simply entering a payment amount and confirming the payment or new or additional information.

Once transmitted, the payment provider receives the payment request at step 316. The payment request may include an identifier of the merchant and/or account and an amount of payment. Additional information may include one or more user or device identifiers.

After the information is received, the payment provider processes the payment request at step 318. If the information is insufficient or incorrect, the payment provider may request the user to re-enter or re-submit some or all of the payment request information. The payment provider may also request additional information, such as a password or other user authenticator. After processing, the payment provider determines whether to approve or deny the payment request, which can be based on any number of factors involved in such a process.

Once the determination is made, a notification is sent at step 320 to the merchant and/or user. The notification may be sent via text, email, voice message, or other means to the user and/or merchant device. In this way, the user and/or merchant is notified of an approved payment or a denied payment. If approved, the notification may also include a receipt presentable on the user device. The user may then show the receipt, payment confirmation, user ID, or other data to the merchant to receive the goods at the merchant store location.

Figure 4:
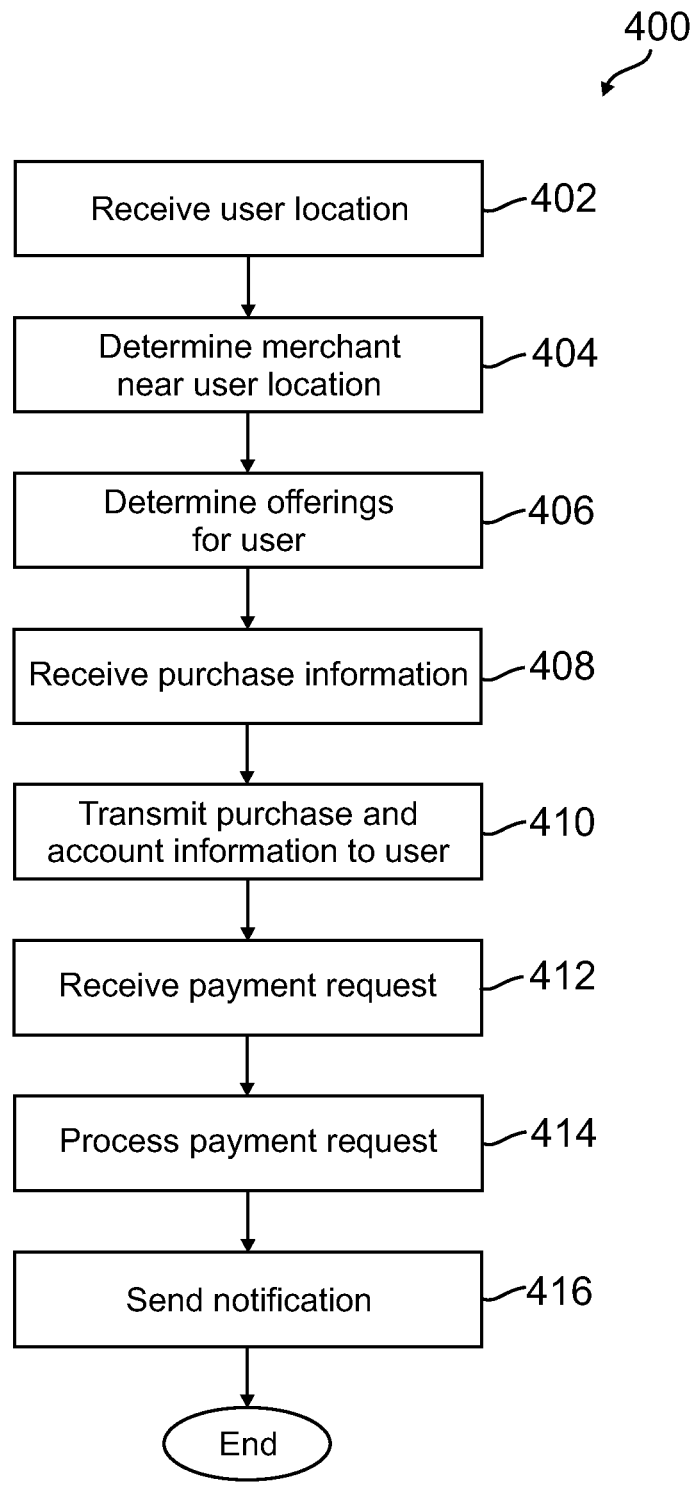
FIG. 4 is a flowchart of steps performed by a payment provider in a location-based transaction, according to another embodiment.

FIG. 4 is a flowchart 400 of steps performed by a payment provider in a location-based transaction, according to another embodiment. At step 402, the payment provider receives a location of the user through the user device, such as described above. Next, the payment provider determines a merchant near the user at step 404, again such as described above. In this example, only a single merchant is assumed, although one of ordinary skill in the art will appreciate that multiple merchants can be near the user location and modify this flowchart as needed.

At step 406, the payment provider determines offerings by the merchant identified at step 404. The offerings may be general or specific to the user. For the latter, the payment provider may have offerings (e.g., goods, services, digital goods, etc.) that the merchant has available for purchase at the specific merchant location, where the offerings are available to everyone and at the same price. A more specific type of offering may be a sale during a certain day or time period for all customers entering the store. For the former, the payment provider may give the user offerings specific to that user, such as based on user information like purchase history. The offering may also be based on time. For example, if the user is entering the store, the user may be presented with specials that are only good for an hour or other shortened time period while the user is in the store.

Merchants may also provide "loyal" or preferred customers additional savings or incentives. Such incentives are known and can be provided by the payment provider, the merchant, or other entity. In one embodiment, the merchant has its inventory "stored" in a cloud so that the merchant may make offerings through any channel by uploading an item from the cloud. For example, the user can place certain items on one website or physical location, for specific users and/or times, etc.

Once the user is presented with offerings available for purchase the merchant location, the user may select desired items for purchase. This can be by tapping or otherwise selecting from a list of offerings on the user device, which may then be added to a cart. Once completed, the user may transmit the information to the payment provider, which is received by the payment provider at step 408. The purchase information may include a list of items and prices.

Next, at step 410, the payment provider may transmit an "invoice" to the user through the user device. For example, the invoice may include a total amount of the purchase, including tax and any other charges, and payment or account information of the merchant or payee. This may be in the form of an easily editable or readable interactive display, allowing the user to make changes if needed. Otherwise, the user may simply confirm or authorize the payment, such as by tapping on or otherwise selecting a button or link on the device.

The authorization is then transmitted to and received by the payment provider at step 412. The payment is then processed at step 414, as is known in the art. The payment provider may request the user to re-enter information or submit some new information if the payment request cannot be processed and/or approved. Once a final determination is made, the payment provider may send a notification to the user and/or the merchant at step 416, such as described above. The user may then receive the purchases at the merchant store location.

As a result, the user can make purchases through the user mobile device, where such purchases may be tailored for the user. The user can then pick up the purchases without waiting in line for scanning and/or checkout. This gives the user a more personalized, faster, and more efficient shopping experience.

Figure 5:
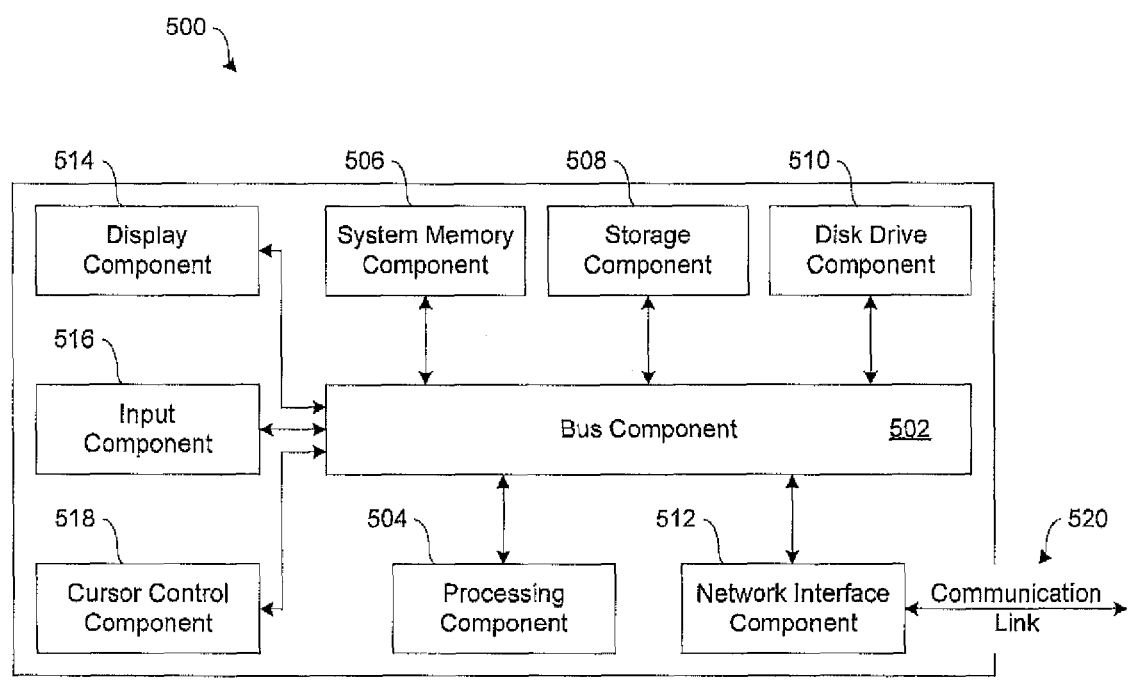
FIG. 5 is a block diagram of a computer system suitable for implementing one or more embodiments of the present disclosure.

FIG. 5 is a block diagram of a computer system 500 suitable for implementing one or more embodiments of the present disclosure, including user device 120, merchant device 140, and/or service provider device 180. In various implementations, client device 120 may comprise a network computing device capable of communicating with network 160, such as a mobile communication device including a cell phone, a personal computer, laptop, PDA, etc., merchant device 140 may comprise a network computing device capable of communicating with network 160, such as a network communication device including a network server and/or a mobile communication device including a cell phone, and service provider device 180 may comprise a network computing device, such as a network server. Hence, it should be appreciated that each of devices 120, 140, 180 may be implemented as computer system 500 in a manner as follows.

In accordance with various embodiments of the present disclosure, computer system 500, such as a cell phone and/or a network server, includes a bus 502 or other communication mechanism for communicating information, which interconnects subsystems and components, such as a processing component 504 (e.g., processor, micro-controller, digital signal processor (DSP), etc.), a system memory component 506 (e.g., RAM), static storage component 508 (e.g., ROM), a disk drive component 510 (e.g., magnetic or optical), network interface component 512 (e.g., modem or Ethernet card), a display component 514 (e.g., CRT or LCD), input component 516 (e.g., keyboard), and a cursor control component 518 (e.g., mouse or trackball). In one implementation, disk drive component 510 may comprise a database having one or more disk drive components.

Display component 514 may allow the user to view items available for purchase at a merchant location, make a purchase, and/or receive a confirmation or receipt of the purchase. Input component 516 may allow the user to enter information as needed for making the purchase and payment. For example, one information that the user may not need to enter is the merchant payment information, which may be automatically included when the user is at a desired merchant location, as discussed above. Cursor control component 518 may allow the user to select desired items for purchase, as well as confirm a payment request to the payment provider.

Computer system 500 may perform specific operations by processor 504 executing one or more sequences of one or more instructions contained in system memory component 506. Such instructions may be read into system memory component 506 from another computer readable medium, such as static storage component 508 or disk drive component 510. In other embodiments, hard-wired circuitry may be used in place of or in combination with software instructions to implement the present disclosure.

Logic may be encoded in a computer readable medium, which may refer to any medium that participates in providing instructions to processor 504 for execution. Such a medium may take many forms, including but not limited to, non-volatile media and volatile media. In various implementations, non-volatile media includes optical or magnetic disks, such as disk drive component 510, and volatile media includes dynamic memory, such as system memory component 506. In one implementation, data related to encoded logic may be transferred to computer system 500 via a communication link 520, and various transmission media, such as coaxial cables, copper wire, and fiber optics, including wires that comprise bus 502, may be utilized in the transfer of data. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 520 (e.g., network 160 of FIG. 1, such as a LAN, WLAN, PTSN, and/or various other wired or wireless networks, including telecommunications, mobile, and cellular phone networks) may perform instruction sequences to practice the present disclosure in coordination with one another.

Computer system 500 may transmit and receive messages, data, information, and instructions, including one or more programs (i.e., application code) through communication link 520 and communication interface 512. Received program code may be executed by processor 504 as received and/or stored in disk drive component 510 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above describes in detail services provided by a payment provider, such as identifying nearby merchants, account information, and offerings. However, these services may be performed by other parties, such as the user device or the merchants. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
   receiving, by a hardware processor of a server coupled to a user mobile device via a network interface component and a network, location information of a user from the user mobile device;
   determining, by the hardware processor, a location of the user based on the location information;
   automatically adjusting, by the hardware processor a threshold distance based on an attribute of an area corresponding to the location of the user;
   determining, by the hardware processor, one or more merchants that are within the threshold distance of the location of the user;
   transmitting, by the hardware processor via the network interface component and the network and after determining the one or more merchants, merchant information of each of the one or more determined merchants to the user mobile device;
   receiving, by the hardware processor via the network interface component and the network, a selection of one of the merchants by the user from among the determined merchants;
   determining, by the hardware processor, one or more offerings of the selected one of the merchants in response to receiving the selection; and
   transmitting, by the hardware processor via the network interface component and the network, the one or more offerings of the selected one of the merchants to the user mobile device.

2. The method of claim 1, further comprising:
   transmitting a list of the merchants to the user mobile device when more than one merchant is within the threshold distance of the location of the user.

3. The method of claim 2, further comprising: transmitting payment information of the selected one of the merchants to the user mobile device via the network interface component and the network, the payment information comprises data for use by the user mobile device in populating a payment request form.

4. The method of claim 1, wherein the location information comprises GPS coordinates.

5. The method of claim 1, wherein the server is managed by a payment provider.

6. The method of claim 5, wherein the merchant information identifies an account of the selected one of the merchants to the payment provider.

7. The method of claim 1, wherein the selected one of the merchants has offerings within the threshold distance of the location of the user.

8. The method of claim 1, wherein the one or more offerings of the selected one of the merchants comprises a time-based specific offering with the selected one of the merchants based on a purchase history of the user.

9. The method of claim 1, further comprising:
   receiving, by the hardware processor via the network interface component and the network, a next selection of at least one of the one or more offerings by the user;
   receiving, by the hardware processor via the network interface component and the network, a payment request for the next selection by the user;
   automatically populating, by the hardware processor, the next selection and associated payment information into a checkout process without the user having to enter the payment information on the user mobile device; and
   processing, by the hardware processor, the payment request based on the payment information.

10. A non-transitory machine-readable medium having stored thereon machine-readable instructions executable to cause a machine to perform operations comprising:
    receiving, from a user device coupled via a network interface component and a network to the machine, location information of a user;
    determining a location of the user based on the location information;
    automatically adjusting a threshold distance based on the location of the user by increasing the threshold distance when the location of the user is in a rural area and decreasing the threshold distance when the location of the user is in a populated shopping area;
    determining one or more merchants that are within the threshold distance of the location of the user;
    transmitting, via the network interface component and the network after determining the one or more merchants, merchant information of each of the one or more determined merchants to the user device;
    receiving, from the user device via the network interface component and the network, a selection of one of the merchants by the user from among the determined merchants;
    determining one or more offerings of the selected one of the merchants in response to receiving the selection; and
    transmitting via the network interface component and the network, the one or more offerings of the selected one of the merchants to the user device.

11. The non-transitory machine-readable medium of claim 10, wherein the operations further comprise transmitting a list of the merchants to the user device when more than one merchant is within the threshold distance of the location of the user.

12. The non-transitory machine-readable medium of claim 10, wherein the operations are performed by a payment provider.

13. The non-transitory machine-readable medium of claim 12, wherein the merchant information identifies an account of the selected one of the merchants to the payment provider.

14. The non-transitory machine-readable medium of claim 10, wherein the selected one of the merchants has offerings within the threshold distance of the location of the user.

15. The non-transitory machine-readable medium of claim 10, wherein the one or more offerings of the selected one of the merchants comprises a time-based specific offering with the selected one of the merchants based on a purchase history of the user.

16. A system comprising:
   a network interface component;
   a non-transitory memory storing instructions; and
   one or more hardware processors coupled to the non-transitory memory and configured to read the instructions from the non-transitory memory to cause the system to perform operations comprising:
   storing account information in the non-transitory memory, wherein the account information comprises merchant account identifiers and merchant location information;
   continuously receiving, via the network interface component and a network, location information of a user from a user device;
   determining a location of the user based on the location information;
   automatically adjusting a threshold distance based on an attribute of an area corresponding to the location of the user;
   determining one or more merchants that are within the threshold distance of the location of the user;
   transmitting, via the network interface component and the network after determining the one or more merchants, merchant information of each of the one or more determined merchants;
   receiving, via the network interface component and the network, a selection of one of the merchants by the user from among the determined merchants;
   determining one or more offerings of the selected one of the merchants in response to receiving the selection; and
   transmitting, via the network interface component and the network, the one or more offerings of the selected one of the merchants to the user device.

17. The system of claim 16, wherein the one or more offerings of the selected one of the merchants comprises a time-based specific offering with the selected one of the merchants based on a purchase history of the user.

\* \* \* \* \*